Oct. 10, 1967   J. B. J. ANIANO ET AL   3,346,742
ALTERNATING CURRENT SIGNAL LEVEL DETECTOR
Filed March 31, 1964   2 Sheets-Sheet 1

INVENTORS
JOHN B.J. ANIANO
WILLIAM O. YAEGER
BY Hubert L. Davis
ATTORNEY

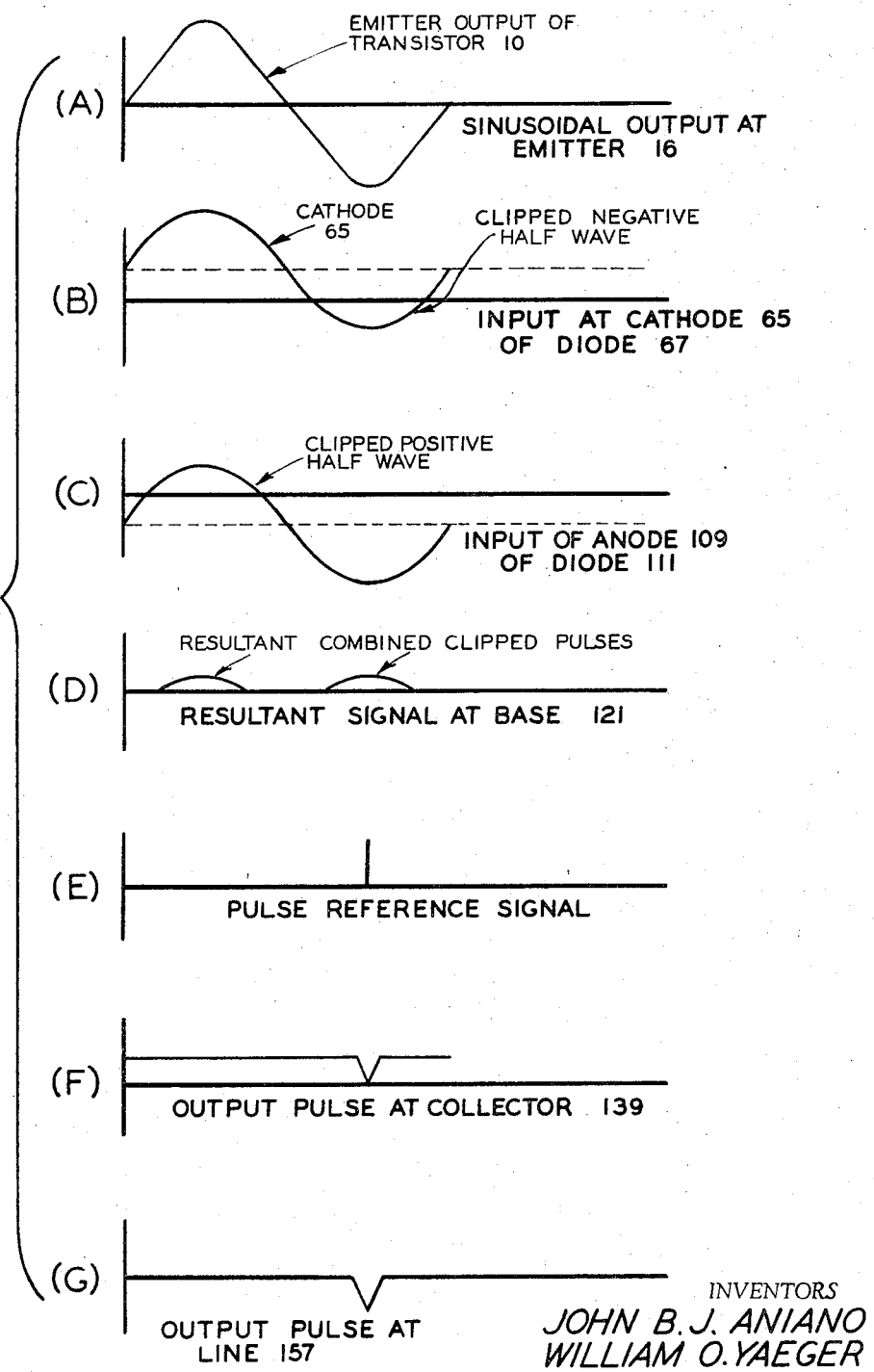

United States Patent Office 3,346,742
Patented Oct. 10, 1967

3,346,742
ALTERNATING CURRENT SIGNAL LEVEL DETECTOR
John B. J. Aniano, Dunellen, and William O. Yaeger, Wayne, N.J., assignors to The Bendix Corporation, Teterboro, N.J., a corporation of Delaware
Filed Mar. 31, 1964, Ser. No. 356,170
8 Claims. (Cl. 307—88.5)

ABSTRACT OF THE DISCLOSURE

A level detector for an alternating current signal. The alternating current signal is rectified and clipped and a gate is operated by the rectified clipped signal and by a reference pulse provided at a frequency corresponding to the frequency of the peak level of the alternating current signal. The gate provides a controlling output when the peak level of the alternating current signal exceeds a predetermined amplitude.

---

This invention relates to an alternating current signal level detector and more particularly to a novel means of determining whether or not the amplitude of a reversible alternating current signal exceeds a preselected voltage level.

The alternating current signal level detector of the present invention is particularly adapted for use with a reference signal selector utilized in an angular displacement to digital converter which may be of a conventional type not deemed necessary to be shown herein.

In such a converter circuit, there may be utilized as a reference signal, one of the outputs of a three-wire to two-wire converter device having a three-wire alternating current signal input and a two-wire alternating current signal output, the arrangement being such as to eliminate the transmitter and other phase shifts from the resulting conversion.

Moreover, the arrangement is such that the output voltage are proportional respectively to the sine of a transmitter position angle, θ, and cosine θ, and either of these voltages may be zero at a particular adjusted position of a synchro or signal transmitter setting so that it is necessary to select the larger of the two voltages for use in a zero crossing detector. The alternating current signal level detector shown herein and forming the subject matter of the present invention is utilized to provide an output pulse when the magnitude of one of the output signals, for example, cosine θ is greater than a preset value, while at all other times the other output signal, for example, sine θ, is used as the reference. When this output pulse from the alternating current signal level detector is generated, the generated pulse is electrically connected to a bistable or flip-flop device which may be of a conventional type arranged to operate a reference selector in response to the generated pulse so as to transfer the effective reference signal from the output signal sine θ to the other output signal cosine θ of greater amplitude whereupon the output signal cosine θ becomes the reference signal.

An object of the present invention is, therefore, to provide a novel alternating current signal level detector adapted to receive an alternating current signal and a reference pulse having a frequency which coincides with the frequency of the peak level of the alternating current signal and including means so arranged as to provide an output pulse whenever the peak level of the alternating current signal exceeds a predetermined amplitude.

Another object of the invention is to provide a novel alternating current signal level detector adapted to receive an alternating current signal and a reference pulse to provide a control output pulse whenever the alternating current signal exceeds a predetermined amplitude at a frequency coincident with that of the reference pulse.

Another object of the invention is to provide a level detector including a full wave rectifier-clipper in which a transistor and diode are so arranged as to rectify and clip the alternating current signal during the positive half cycle thereof and transistors and diodes are so arranged as to rectify, clip and invert the alternating current signal during the negative half cycle thereof, and in which circuitry there is provided an AND gate including a pair of transistorized current control devices, one of which is arranged to be selectively operated by the output of the full wave rectifier-clipper while the other transistorized current control device is arranged to be operated by a reference signal pulse which, when the peak level of a cycle of the alternating current signal exceeds a predetermined amplitude, serves to effect operation of the other device in cooperative relation with the first-mentioned device so as to provide pulsating output signals to effect a control function.

Another object of the invention is to provide a novel alternating current signal level detector for determining whether or not the amplitude of a reversible alternating current signal exceeds a preselected voltage level.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

In the drawings:

FIGURE 2 is a graphical illustration showing the voltage waveforms at the designated points in the electrical network of FIGURE 1.

Figure 1:
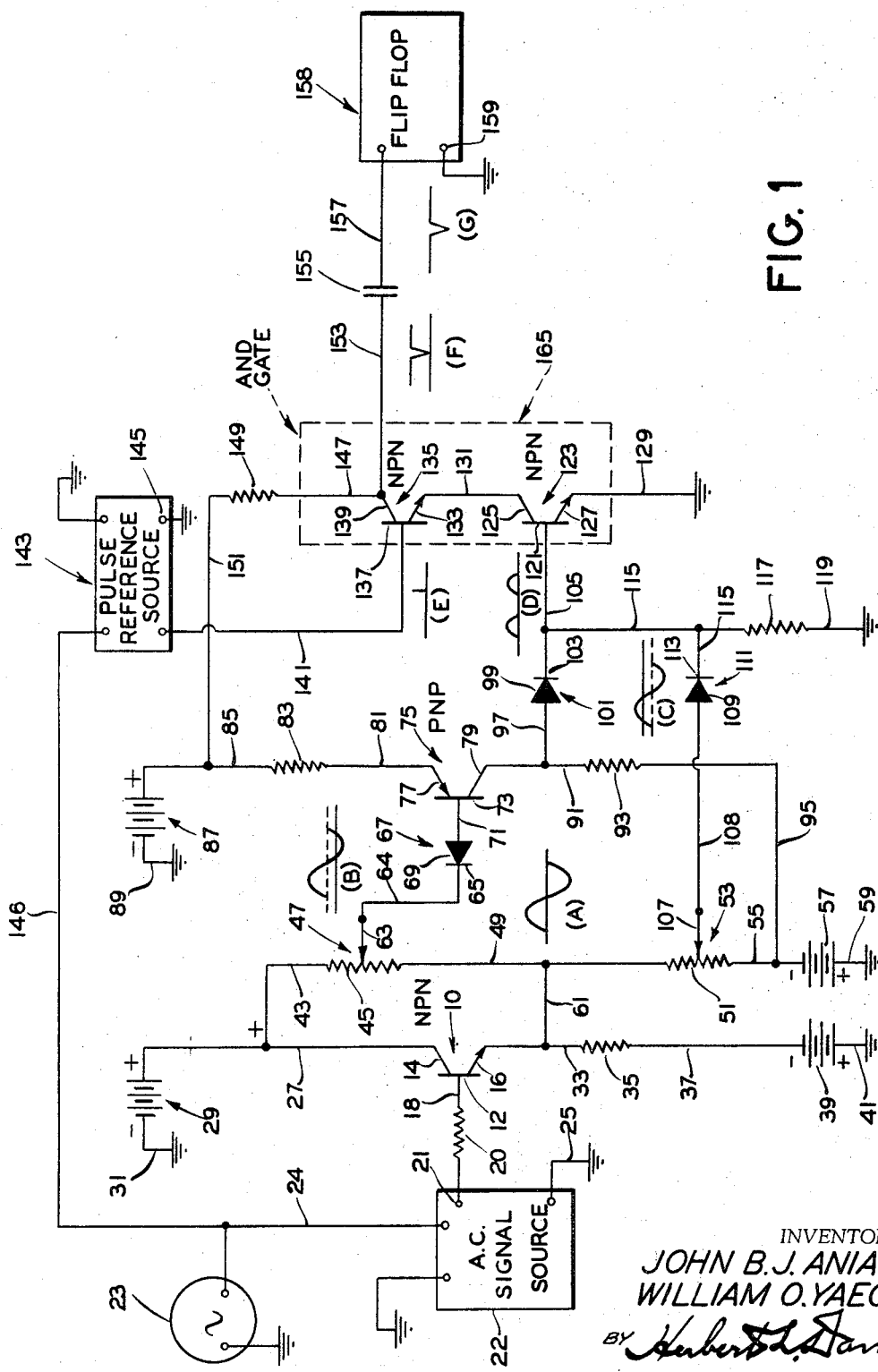
FIGURE 1 is a wiring diagram of an alternating current signal level detector embodying the present invention.

Referring to the drawing of FIGURE 1, the alternating current signal level detector includes an N-P-N transistor 10 having a base electrode 12, collector electrode 14 and emitter electrode 16. The base electrode 12 is connected by an input conductor 18 through a resistor 20 to one terminal 21 of a suitable alternating current signal source or device 22, shown diagrammatically as a box, and which may include the angular displacement to a digital converter with which the detector of the present invention may be utilized, as heretofore explained. The device 22 has an opposite output terminal 25 connected to ground.

The signal source 22 may be energized from an alternating current source 23 through a conductor 24, as shown diagrammatically in FIGURE 1.

The collector electrode 14 is connected through an electrical conductor 27 to a positive terminal of a source of electrical energy or battery 29 having a negative terminal 31 connected to ground. The emitter electrode 16 is connected through a conductor 33, resistor 35, and conductor 37 to a negative terminal of a source of electrical energy or battery 39 having a positive terminal connected by a conductor 41 to ground.

Further, leading from the positive terminal of the source of electrical energy 29 and electrical conductor 27 is a conductor 43 connected to one terminal of a resistor element 45 of a potentiometer 47. The opposite terminal of the resistor element 45 is connected through a conductor 49 to one terminal of a resistor element 51 of a potentiometer 53. The opposite terminal of the resistor element 51 is connected through a conductor 55 to a negative terminal of a source of electrical energy or battery 57 having an opposite positive terminal connected by a conductor 59 to ground. Further, an output conductor 61 leads from the emitter electrode 16 of the transistor 10 to the conductor 49.

The potentiometer 47 has an adjustable arm 63 arranged in cooperative relation with the resistor element 45 and connected through a conductor 64 to a cathode element 65 of a diode 67 having an anode element 69. The anode element 69 is connected by a conductor 71 to a base electrode 73 of a P-N-P transistor 75 having an emitter element 77 and a collector element 79.

The emitter element 77 of the transistor 75 is connected by a conductor 81, resistor 83, and conductor 85 to the positive terminal of the source of electrical energy or battery 87 having a negative terminal connected by a conductor 89 to ground. Further, the collector 79 of the transistor 75 is connected by a conductor 91, resistor 93 and conductor 95 to the conductor 55 leading from the negative terminal of the source of electrical energy or battery 57.

An output conductor 97 leads from the collector 79 to an anode element 99 of a diode 101 having a cathode element 103. Leading from the cathode element 103 is a conductor 105.

The transistor 10, diode 67, transistor 75 and diode 101 are arranged then to rectify the sinusoidal output signal (A), shown in FIGURES 1 and 2, and applied at the emitter 16 during the negative half cycle of the alternating current signal applied at the cathode 65 of the diode 67, as shown diagrammatically at (B) so that, when this negative half cycle of the signal exceeds a preset value, there is applied at the output line 105, the clipped negative half cycle of the wave (B) which has been inverted by the transistor 75 and applied as the second positive pulse (D), the first positive pulse (D) of FIGURE 2 being obtained from the rectified and clipped positive half cycle of the sinusoidal output signal (A) applied at the emitter 16, as hereinafter explained. Thus, in order to effect the rectified and clipping action upon the positive half of the sinusoidal output signal (A) applied at the emitter 16 exceeding a preset value, there is provided the potentiometer 53 which includes an adjustable arm 107 arranged in cooperative relation with the resistor element 51 and electrically connected through conductor 108 to an anode element 109 of a diode 111 having a cathode element 113 connected by an electrical conductor 115 to a conductor 105 and through a resistor 117 to a ground connection 119.

Through the foregoing arrangement, the transistor 10 and the diode 111 serve to rectify and clip the positive half cycle of the alternating current signal, as shown diagrammatically at (C) upon such positive half cycle exceeding a preset value determined by the adjustment of the potentiometer arm 107, and which clipped positive half cycle signal is in turn combined at the conductor 105 with the clipped and inverted negative half cycle signal effected, as heretofore explained, so as to provide the positive pulses (D), as indicated graphically in FIGURE 2.

The positive pulses (D) of FIGURE 2, are in turn applied through the conductor 105 to the base element 121 of an N-P-N transistor 123. The transistor 123 has a collector element 125 and an emitter element 127. The emitter element 127 is connected to a ground conductor 129 while the collector electrode 125 is connected by a conductor 131 to an emitter element 133 of a second N-P-N transistor 135. The transistor 135 has a base electrode 137 and a collector electrode 139.

The base electrode 137 is connected through a conductor 141 to one terminal of a suitable pulse reference source 143. The opposite terminal 145 of the pulse reference source 143 is connected to ground.

The pulse reference source 143 may be energized through a conductor 146 from the common source of alternating current 23 or may be otherwise operated in synchronism with the alternating current signal applied from the device 22 to the base 12 of transistor 10.

Thus, the pulse reference source 143 applies positive pulses such as shown graphically at (E) of FIGURES 1 and 2 to the base electrode 137 of the transistor 135 in synchronism with at least every other one of the clipped positive pulses (D) applied to the base electrode 121 of transistor 123.

In the arrangement of the transistor 135, the collector electrode 139 is connected to an output conductor 147 and through resistor 149 and conductor 151 to the conductor 85 leading from the positive terminal of the source of electrical energy or battery 87. Leading from the collector electrode 139 is also an output conductor 153 which is coupled by a coupling capacitor 155 to a conductor 157 leading to the input of a suitable device 158 which may be a conventional flip-flop arranged to be operated by a pulsating output negative signal such as shown at (F) of FIGURES 1 and 2. The device 158 may have an opposite input terminal 159 connected to ground. The device 158 may be a suitable bistable control of an angular displacement to digital converter of conventional type which may be included in the device 22, as heretofore explained.

In the aforenoted arrangement, it will be seen that the transistors 123 and 135 provide an AND gate 165. Thus, the alternating current signal level detector of the present invention includes full wave rectifier-clipper, as heretofore explained, followed by the AND gate 165.

In such arrangement, the transistor 10 and diode 111 rectify and clip the positive half cycle of the alternating current signal applied at the emitter 16 of the transistor 10 while the transistors 10 and 75 and the diodes 67 and 101 cooperate to rectify, clip and invert the negative half cycle of the alternating current signal applied at the emitter 16.

Furthermore, the emitter follower stage of the transistor 10 presents a sufficiently high input impedance to avoid "loading" of the signal source 22 while the potentiometers 47 and 53 provide means for effecting an adjustable reverse direct current bias on the diodes 67 and 111, respectively. Thus, when the alternating current input signals, shown graphically at (B) and (C) of FIGURES 1 and 2, applied to the diodes 67 and 111 are of a sufficiently high amplitude as to exceed a preset value set by the adjustment of the arms 63 and 107 of the potentiometers 47 and 53, the diodes 67 and 111 begin to conduct.

Moreover, in the aforenoted arrangement, the transistor 75 controlled by the diode 67 serves to invert the negative half cycle pulse clipped or passing through the diode 67 so as to provide a resultant positive pulse signal applied to the base 121 of the transistor 123, as shown graphically at (D) of FIGURES 1 and 2.

Similarly, the diode 111 serves to clip the positive half cycle of the input signal which is of a sufficient amplitude as to exceed the value set by the adjustment of the arm 107 of potentiometer 53 so that a resultant positive pulse signal is applied through the diode 111 to the conductor 115 and thereby to the conductor 105 leading to the base 121 of the transistor 123. The clipped half cycle negative pulse and the clipped half cycle positive pulse applied through the diodes 101 and 111 are in turn combined at the conductor 105 and the resultant signal applied to the base 121 of the transistor 123.

Thus, these pulses shown graphically at (D) and coinciding in frequency with the sinusoidal wave (A) may provide sufficient drive to saturate the N-P-N transistor 123 so that a negative output pulse is then generated at the collector 125.

Similarly, the reference pulses, shown graphically at (E) and applied to the base 137 of the transistor 135 serve to saturate the transistor 135 in synchronism with the last half cycle positive pulse (D) applied to the base 121 of the transistor 123. The positive reference pulse (E) applied at base 137 coincides with the peak of the positive signal pulse (D) applied to the base 121 of the transistor 123 rendering both transistors 135 and 123 conductive whereupon the positive potential applied at collector electrode 139 will be sharply decreased to provide an output pulse, shown graphically at (F) of FIGURE 2, which output pulse (F) is in turn coupled through the capacitor 155 to the line 157 so as to apply at the line 157 a negative going signal pulse, as shown graphically at (G) of FIGURE 2, to operate the device 158 which may be a flip-flop operated in a conventional manner by the negative going signal pulse (G).

However, if the amplitude of the sinusoidal input signals are less than the critical clipped value set by the adjustment of the potentiometer arms 63 and 107, the positive and negative back bias applied, respectively, thereby to the diodes 67 and 111 renders the diode 67 and the diode 111 ineffective to conduct the pulses (D), and therefore, the transistor 123 will not be saturated and the output pulse, shown graphically at (F) of FIGURE 2, will not be generated at the ouput conductor 153, nor will the negative going signal pulse (G) be effected.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. An alternating current signal level detector comprising a full wave rectifier including means for clipping positive and negative half waves of an alternating current signal in excess of predetermined amplitudes, means for combining said clipped half waves in a series of control pulses, gate means including a pair of serially connected current control devices, one of said devices being controlled by said series of control pulses, pulse reference source means for supplying reference pulses in synchronism with said control pulses, and means for applying said reference pulses to said other current control device so as to effect the control of said other current control device in synchronism with the control of said one control device to effect an output signal pulse through said pair of serially connected current control devices upon the alternating current signal exceeding said predetermined amplitudes.

2. The combination defined by claim 1 including means for back biasing the means for clipping the positive and negative half waves of the alternating current signal so as to render said clipping means effective upon said half waves exceeding said predetermined amplitudes.

3. The combination defined by claim 2 in which said back biasing means includes adjustable potentiometer means connected to the clipping means for setting the predetermined amplitudes at which the positive and negative half waves of the alternating current signal may be effectively clipped.

4. The combination defined by claim 1 in which the means for clipping the positive and negative half waves of the alternating current signal includes a first diode means for clipping the positive half waves in excess of a predetermined amplitude, a second diode means for clipping the negative half waves of the alternating current signal in excess of a predetermined amplitude, means for inverting the negative clipped half waves, and means for supplying said inverted half waves to the combining means.

5. An alternating current signal level detector comprising a first current control device having an emitter element, a collector element, and a base element, a first source of direct current connected across said collector and emitter elements, means connecting the alternating current signal to the base element for controlling a flow of current from said first source through the first current control device, a pair of adjustable potentiometers, one of said potentiometers having a first resistor element connected to the collector element of the first current control device, the other of said potentiometers having a second resistor element serially connected to the first resistor element, means connecting the emitter element of the first current control device to a point intermediate said first and second serially connected resistor elements, a second source of direct current having a negative terminal connected to the second resistor element and a positive terminal connected to a negative terminal of said first source of direct current, said one pontentiometer having a first adjustable arm arranged in cooperative relation with the first resistor element, the other of said potentiometers having a second adjustable arm arranged in cooperative relation with the second resistor element, a first diode having a cathode element and an anode element, the cathode element of said first diode being connected to said first adjustable arm, a second current control device having an emitter element, a collector element, and a base element, the collector element of the first diode being connected to the base element of the second current control device, a third source of direct current having a positive terminal connected to the emitter element of the second current control device, said third source having a negative terminal connected to the positive terminal of the second source, the collector element of said second control device being connected to the negative terminal of said second source, the second current control device having an output conductor leading from the collector element of the second current control device, a second diode having an anode element and a cathode element, the anode element of said second diode being connected to the output from the second current control device, the second current control device being arranged to apply to the output conductor thereof a positive pulse upon a negative pulse being applied through the first diode to the base element of the second current control device, a third diode having an anode element and a cathode element, the anode element of the third diode being connected to the second adjustable arm of said other potentiometer, and a common output conductor leading from the cathode elements of the second and third diodes so as to combine in said common output conductor positive signal pulses corresponding to clipped half waves of the alternating current signal effected at said first and third diodes, and gate means operated by said pulses for effecting a control function.

6. The combination defined by claim 5 in which the gate means includes a third current control device and a fourth current control device, the first control device being operated by positive pulses supplied by said common output conductor, a pulse reference source, means connecting said pulse reference source to said second control device to effect operation thereof in synchronism with the first control device so as to effect said control function upon the first control device being operated in simultaneous relation with the second control device.

7. The combination comprising first means for supplying an alternating current electrical signal, second means for supplying electrical reference pulses in synchronism with said alternating current signal and in coincidence with a peak of the alternating current signal, gating means, rectifying and clipping means for operatively connecting the alternating current signal supplied by said first means to said gating means, other means operatively connecting the reference pulses supplied by said second means to said gating means, said gating means including means jointly operated by the alternating current signal and the reference pulse to provide an output pulse whenever the peak of the alternating current signal exceeds a predetermined amplitude.

8. The combination comprising a full wave rectifier means including diode means to rectify and clip an alternating current signal in one sense, other diode and transistor means to rectify, clip, and invert the alternating current signal in another sense, means for combining the clipped signals in a common output from said full wave rectifier means, first and second transitorized current control devices, the first of said current control devices being selectively operated by the common output from the full wave rectifier means, a pulse reference source for supplying reference pulses in synchronism with the alternating current signal, means connecting said pulse reference source to said second current control device so that upon the alternating current signal in one of said senses exceeding a predetermined amplitude, operation of the second device may be effected in cooperative relation with the first device so as to provide a pulsating output signal to effect a control function.

No references cited.

ARTHUR GAUSS, *Primary Examiner.*

J. ZAZWORSKY, *Assistant Examiner.*